US009107065B2

(12) United States Patent
Dharawat et al.

(10) Patent No.: US 9,107,065 B2
(45) Date of Patent: Aug. 11, 2015

(54) SECURE INFORMATION TRANSFER VIA BAR CODES (71) Applicant: GOOGLE TECHNOLOGY HOLDINGS LLC, Mountain View, CA (US)

(72) Inventors: Parikshit Dharawat, Sunnyvale, CA (US); Su-Yin Gan, Mountain View, CA (US); Ansuman Tapan Satpathy, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 84 days.

(21) Appl. No.: 13/656,863

(22) Filed: Oct. 22, 2012

(65) Prior Publication Data
US 2014/0115331 A1 Apr. 24, 2014

(51) Int. Cl.
*H04L 9/00* (2006.01)
*H04W 12/02* (2009.01)
*G06K 19/06* (2006.01)
*H04W 12/12* (2009.01)

(52) U.S. Cl.
CPC ......... *H04W 12/02* (2013.01); *G06K 19/06037* (2013.01); *H04W 12/12* (2013.01)

(58) Field of Classification Search
CPC ........... G06K 19/06037; H04W 12/12; H04W 12/02; H04L 29/06
USPC .............................. 713/167; 726/5; 235/462.1
See application file for complete search history.

(56) References Cited

U.S. PATENT DOCUMENTS

| 7,490,134 | B2 | 2/2009 | Ono et al. |
| 7,823,768 | B2 | 11/2010 | Self et al. |
| 8,128,470 | B2 | 3/2012 | Chao Cheng et al. |
| 2008/0298596 | A1 | 12/2008 | Kuraki et al. |
| 2009/0212111 | A1* | 8/2009 | Krichi et al. ............. 235/462.11 |

(Continued)

FOREIGN PATENT DOCUMENTS

AU 2009202557 A1 1/2011
EP 1975847 A1 10/2008

(Continued)

OTHER PUBLICATIONS

Patent Cooperation Treaty, "PCT Search Report and Written Opinion of the International Searching Authority" for International Application No. PCT/US2013/061819 dated Mar. 12, 2014, 19 pages.
ISO/IEC 18004 Information Technology—Automatic identification and data capture techniques—QR Code 2005 bar code symbology specification International Standard ISO/IEC, Second edition, Sep. 1, 2006, pp. 1-114.

(Continued)

Primary Examiner — Baotran N To
(74) Attorney, Agent, or Firm — Morris & Kamlay LLP (57) ABSTRACT A method for providing a document using a secure bar code includes encrypting the document to generate an encrypted document, and mixing together bits for a security credential with bits for the encrypted document to generate a set of mixed bits having a predetermined order. The security credential is for decrypting the encrypted document. The method further includes inserting the set of mixed bits into the secure bar code and outputting the secure bar code. A bar code reader knows the predetermined order and is configured to read the secure bar code. The bar code reader may also be configured to un-mix the mixed bits based on the predetermined order, and decrypt the encrypted document with the security credential.

13 Claims, 5 Drawing Sheets

(56) References Cited

U.S. PATENT DOCUMENTS

2010/0327066 A1    12/2010   Khan
2012/0138679 A1     6/2012   Doyle

FOREIGN PATENT DOCUMENTS

EP        2000950 A1    10/2008
JP     2008199496 A     8/2008

OTHER PUBLICATIONS

QRandEncryption Rather QR codes Public Key Encryption and You, http://code.google.com/p/androidonthespot/wiki/QRandEncryption, Jun. 25, 2012, all pages.

Inlite, "Barcodes and Imaging", http://www.inliteresearch.com/, Oct. 8, 2012, 1 page.

Kaywa, "Kaywa Services for the Mobile Internet", http://www.kaywa.com/, Oct. 8, 2012, 1 page.

* cited by examiner

SECURE INFORMATION TRANSFER VIA BAR CODES

BACKGROUND

Information can be shared between computing devices by a variety of techniques. For example, a first computing device displays a bar code and another computing device reads the bar code. The first computing device may insert information to be shared into the bar code and then display the bar code. The second computing device uses a bar code reading device to read the bar code and extract the information from the bar code. The two computing devices may be mobile devices in which case bar code sharing may likely occur in public places where unintended recipients can easily intercept the displayed bar code with their computing devices. Therefore, without security measures, the information may be compromised.

DETAILED DESCRIPTION

Described herein are techniques for displaying information in a secure bar code that has security features to protect the information from detection by people using bar code readers who are not the intended recipients of the information.

According to one embodiment, a method for providing a document using a secure bar code includes encrypting the document to generate an encrypted document, and mixing together bits for a security credential with bits for the encrypted document to generate a set of mixed bits having a predetermined order. The security credential is for decrypting the encrypted document. The method further includes inserting the set of mixed bits into the secure bar code and outputting the secure bar code. A selected bar code reader knows the predetermined order and is configured to read the secure bar code. The bar code reader is configured to un-mix the mixed bits based on the predetermined order to separate the encrypted document from the security credential, and decrypt the encrypted document with the security credential.

According to another embodiment, a method for providing a document using a secure bar code includes encrypting, via a computing device, the document to generate an encrypted document, and inserting, via the computing device, the encrypted document and a network address into the secure bar code. The network address identifies a network location of a security credential usable for decrypting the encrypted documents. The method further includes outputting the secure bar code on a display of the computing device. A bar code reader is configured to read the secure bar code and access the network location based on the network address to retrieve the security credential. Thereafter, the bar code reader is configured to decrypt the encrypted document with the security credential.

According to another embodiment, a method for providing a document using a secure bar code includes inserting the document into the secure bar code. The method further includes outputting, via a computing device, the secure bar code for display, and outputting, via the computing device, a masking image masking the secure bar code. The masking image masks the display of the secure bar code according to a masking technique. A bar code reader is configured to read the secure bar code and the masking image. The bar code reader is further configured to separate the masking image from the secure bar code based on the masking technique to isolate the secure bar code. Thereafter, the bar code reader is configured to extract the document from the secure bar code.

According to another embodiment, a non-transitory computer-readable storage medium includes instructions for providing a document using a secure bar code. The instructions, when executed, are for controlling a computing device to be configured for: encrypting the document to generate an encrypted document; mixing together bits for a security credential with bits for the encrypted document to generate a set of mixed bits having a predetermined order, wherein the security credential is for decrypting the encrypted document; inserting the set of mixed bits into the secure bar code; and outputting the secure bar code, wherein a bar code reader knows the predetermined order and is configured to read the secure bar code, un-mix the mixed bits based on the predetermined order, and decrypt the encrypted document with the security credential.

According to another embodiment, a non-transitory computer-readable storage medium includes instructions for providing a document using a secure bar code. The instructions, when executed, are for controlling a computing device to be configured for: encrypting the document to generate an encrypted document; inserting the encrypted document and a network address into the secure bar code, wherein the network address identifies a network location of a security credential for decrypting the encrypted documents; and outputting the secure bar code on a display of the computing device. A bar code reader is configured to read the secure bar code, access the network location based on the network address to retrieve the security credential. Thereafter, the bar code reader is configured to decrypt the encrypted document with the security credential.

According to another embodiment, a non-transitory computer-readable storage medium includes instructions for providing a document using a secure bar code. The instructions, when executed, are for controlling a computing device to be configured for: inserting the document into the secure bar code; outputting the secure bar code for display; and outputting a masking image masking the secure bar code. The masking image masks the display of the secure bar code according to a masking technique. A bar code reader is configured to read the secure bar code and the masking image. The bar code reader is further configured to separate the masking image from the secure bar code based on the masking technique to isolate the secure bar code, and extract the document from the secure bar code.

Figure 1:
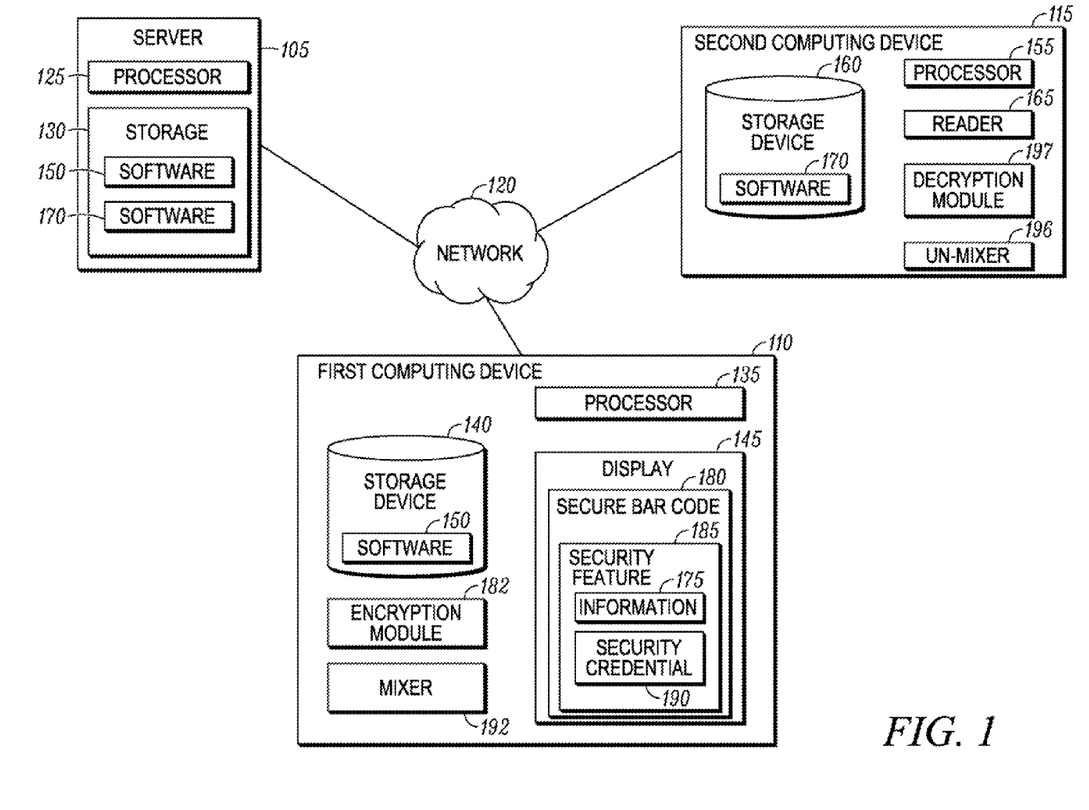
FIG. 1 depicts a communication system according to one embodiment.

FIG. 1 depicts a computing system 100 according to one embodiment. Computing system 100 includes a server 105, a first computing device 110, a second computing device 115, and a network 120. Server 105 may be a computing device configured to operate a server operating system. Server 105 includes a processor 125 and a storage device 130. First computing device 110 includes a processor 135, a storage device 140, and a display 145. Storage device 140 may store software 150, which may be supplied from storage device 140 to processor 135 for execution. Similarly, second computing device 115 includes a processor 155 (e.g., a microprocessor, a microcontroller, control logic, etc.), a storage device 160, and a reader 165. Storage device 160 may similarly store software 170, which may be supplied from storage device 160 to processor 155 for execution. Storage devices 130, 140, and 160 may be non-transitory computer readable storage mediums. First and second computing devices 110 and 115 may include a variety of devices, such as mobile devices (e.g., personal digital assistants (PDAs), smartphones, a bar code reader, etc.), a desktop computer, a laptop computer, a tablet computer, etc. Network 120 may include one or more communication networks, such as one or more intranets, the Internet, etc.

According to one embodiment, first computing device 110 displays information 175 (e.g., a document) that is represented in a secure bar code 180 on display 145. Secure bar code 180 includes a security feature 185 to defeat an unauthorized computing device from extracting information 175 from secure bar code 180 if the unauthorized computing device intercepts secure bar code 180. Second computing device 115 includes software and/or hardware that allows second computing device 115 to read secure bar code 180 and decode or otherwise disable security feature 185 to extract information 175 from secure bar code 180. Embodiments of security feature 185 are described in further detail below.

Figure 2:
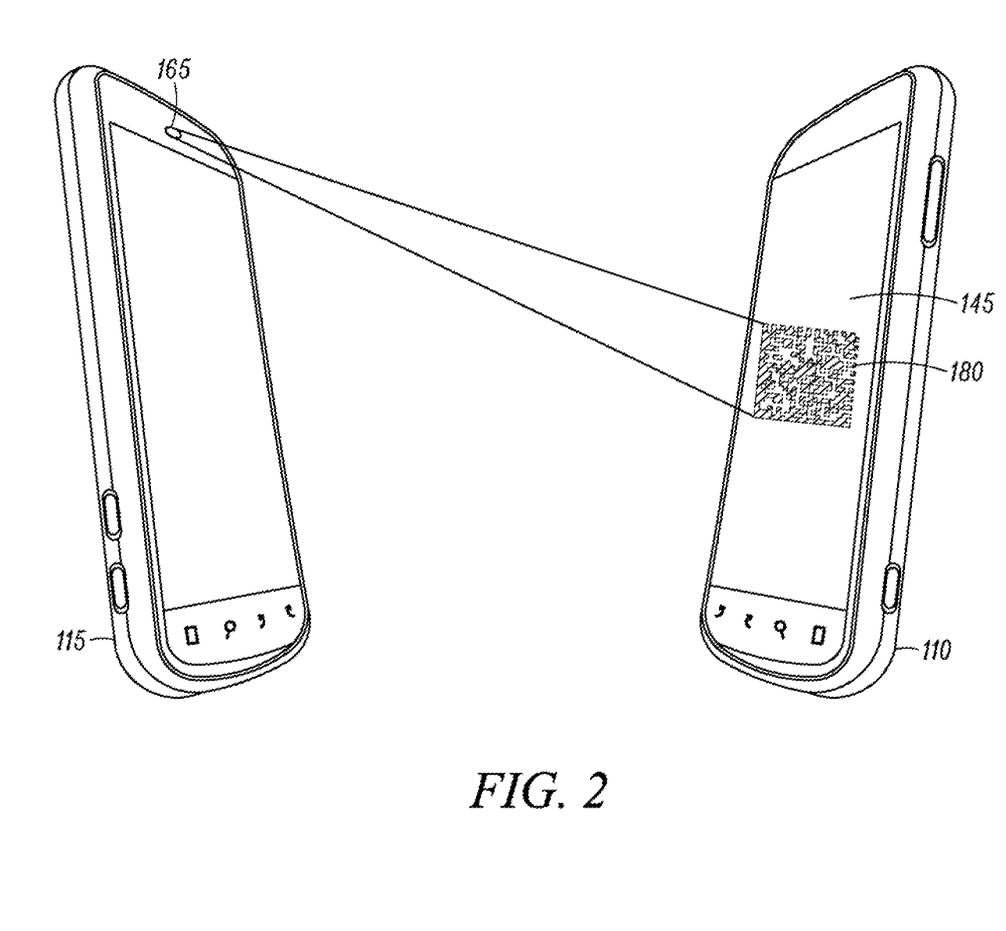
FIG. 2 depicts a first computing device displaying a secure bar code on the display of the first computing device and a second computing device reading the secure bar code from the display.

Referring to FIG. 2, the figure depicts first computing device 110 displaying secure bar code 180 on display 145. FIG. 2 further depicts second computing device 115 using reader 165 to read secure bar code 180 from display 145 of first computing device 110. According to one embodiment, reader 165 of second computing device 115 includes a camera that captures an image (sometimes referred to as reading) of secure bar code 180. According to an alternative embodiment, reader 165 includes a scanner (e.g., a laser scanner) that scans secure bar code 180. First computing device 110 and second computing device 115 are depicted as smartphones. However, embodiments described herein are not limited to smartphones.

Secure bar code 180 may be a two-dimensional bar code, such as a quick response (QR) code, as depicted in FIG. 2. Alternatively, secure bar code 180 may be a one-dimensional bar code.

Referring again to FIG. 1, according to one embodiment, information 175 is encrypted by an encryption algorithm. First computing device 110 may perform the encryption via an encryption module 182, which may be a software module included in software 150. Information 175, now in encrypted form, may be incorporated in secure bar code 180, for example, by first computing device 110. A security credential 190 (e.g., a key) used for decrypting information 175 may also be inserted into secure bar code 180, for example, by first computing device 110. According to a specific embodiment, the bits composing information 175 and the bits composing security credential 190 are mixed together (i.e., scrambled) in a predetermined order, and the resulting mixed bits are inserted in secure bar code 180. First computing device 110 may include a mixer 192 that mixes the bits. In one embodiment, the mixed bits of information 175 and security credential 190 constitute security feature 185. An unauthorized computing device that reads secure bar code 180 will not know the predetermined order and thus cannot easily un-mix the mixed bits to extract information 175 and security credential 190 from security feature 185, and consequently will not be able to decrypt information 175 to obtain a clear text version of information 175.

According to one embodiment, another computing device (e.g., server 105) may generate secure bar code 180, as described both above and below, and transfer secure bar code 180 to first computing device 110 for storage, display, and/or further transfer to another computing device. According to an embodiment where first computing device 110 generates secure bar code 180, first computing device 110 may transfer secure bar code 180 to another computing device, for storage, display, and/or further transfer.

According to one embodiment, second computing device 115 may receive and store scrambling information that specifies the predetermined order so that the mixed bits may be un-mixed by second computing device 115. Second computing device 115 may include an un-mixer 196 that un-mixes the mixed bits based on the scrambling information. Reader 165 may capture an image of secure bar code 180 or otherwise scan secure bar code 180, and un-mix the mixed bits based on the scrambling information. Subsequent to un-mixing, a decryption module 197 of second computing device 115 may use security credential 190 to decrypt information 175.

First computing device 110 may provide the scrambling information to second computing device 115. According to another embodiment, another computing device, such as server 105, provides the scrambling information to first and second computing devices 110 and 115.

According to another embodiment, the predetermined order is selected from a number of predetermined orders where each of the predetermined orders is unique. Each predetermined order is associated with a unique marker position that is located in secure bar code 180. A marker that is located at a selected marker position is an indicator of a particular predetermined order which is associated with the marker position. Server 105 or computing device 110 may insert the marker in secure bar code 180 at the selected marker position. The selected marker position of the maker is determined by computing device 115 when computing device 115 reads the secure bar code. Thereafter, second computing device 115 determines that the bits composing information 175 and the bits composing security credential 190 were mixed according to the particular predetermined order based on the selected marker position of the marker.

Server 105 may host subscription accounts for users of first and/or second computing devices 110 and 115 for providing the scrambling information to first and second computing devices 110 and 115. The subscription accounts may be secure accounts that are accessible via a password, a security credential, or the like. Server 105 may also provide software 150 and 170 to first and second computing devices 110 and 115, respectively, where software 150 may be used for generating secure bar code 180, and software 170 may be used for determining information 175 from secure bar code 180.

Figure 3:
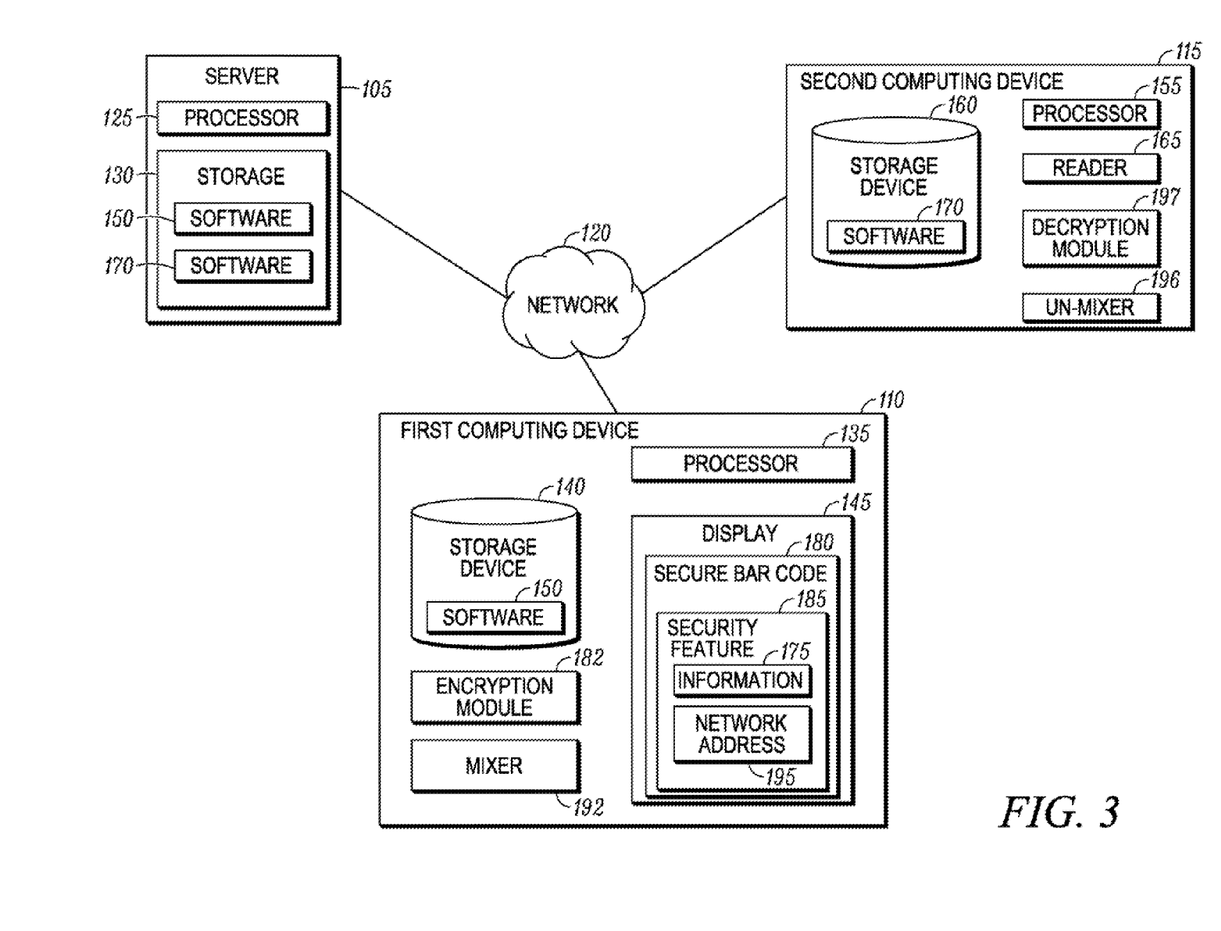
FIG. 3 depicts a computing system according to an alternative embodiment.

FIG. 3 depicts a computing system 300 according to an alternative embodiment. Computing system 300 is substantially similar to computing system 100, but computing system 300 differs from computing system 100 in that secure bar code 180 includes a network address (e.g., a uniform resource locator (URL)) 195 for a network location (e.g., a computing system) at which security credential 190 may be retrieved. More specifically, secure bar code 180 includes information 175 in an encrypted form and includes network address 195 where secure bar code 180 may be displayed on display 145.

Network address 195 may be for a network location of the subscription account held by the user of second computing device 115. The subscription account may be provided by server 105 that may operate in conjunction with a domain controller, a user controller, or the like to provide security credential 190 to second computing device 115. After second computing device 115 uses network address 195 to retrieve security credential 190, second computing device 115 uses security credential 190 to decrypt information 175. Network address 195 and information 175 may be concatenated, without mixing, as security feature 185 according to one embodiment. A user of a computing device that does not have access to the subscription account of the user of second computing device 115 will not be able to retrieve security credential 190 for decrypting information 175. According to a further embodiment, information 175 and network address 195 may be mixed as described above in the predetermined order where second computing device 115 uses the scrambling information to un-mix information 175 and network address 195.

Figure 4:
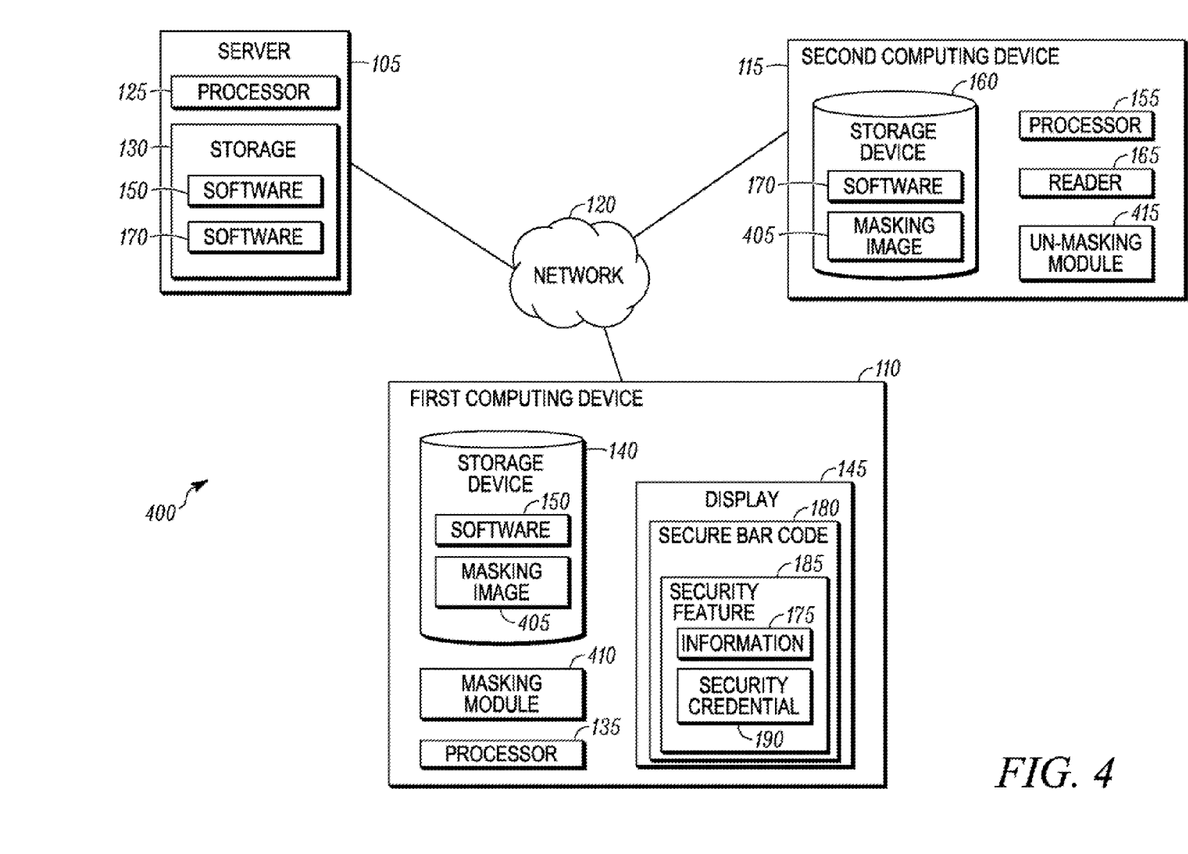
FIG. 4 depicts a computing system according to another alternative embodiment.

FIG. 4 depicts a computing system 400 according to an alternative embodiment. Computing system 400 is substantially similar to computing system 100, but differs from computing system 100 in that first computing device 110 displays a masking image 405 with secure bar code 180 on display 145 according to one embodiment. Masking image 405 masks secure bar code 180 so that secure bar code 180 is less easily detectable than the display of secure bar code 180 without masking image 405. Masking image 405 may mask secure bar code 180 according to a masking technique, which is one embodiment of security feature 185. Masking image 405 may be any suitable image that can mask the display of secure bar code 180. According to one embodiment, first computing device 110 includes a masking module 410 that executes the masking technique to mask secure bar code 180 with masking image 405 on display 145. Masking module 410 may include a portion of software 150 and may be supplied to first computing device 110 by server 105.

Second computing device 115 may include an un-masking module 415, which executes an un-masking technique to un-mask masking image 405 from secure bar code 180. The un-masking technique may use a copy of masking image 405, which is stored in storage device 160, to un-mask masking image 405 from secure bar code 180. Un-masking module 415 may include a portion of software 170 and may be supplied to second computing device 115 by server 105.

A computing device that is unaware that masking image 405 is masking secure bar code 180 may not detect secure bar code 180 on display 145. For example, the computing device may not include un-masking module 415 and/or may not store a copy of masking image 405 that may be used by un-masking module 415 for un-masking secure bar code 180.

Secure bar code 180, masked by masking image 405, may include one or more of security features 185 described above. For example, secure bar code 180 masked by masking image 405 may include information 175 in encrypted form mixed with security credential 190, or may include information 175 in encrypted form and network address 195 for the network location from which security credential 190 is retrievable.

According to one embodiment, first computing device 110 retrieves masking image 405 from another computing device, such as server 105. Masking image 405 may be associated with a network address that is used by first computing device 110 for retrieving masking image 405. The network address may be a uniform resource locator (URL). First computing device 110 inserts the network address into bar code 180.

Figure 5:
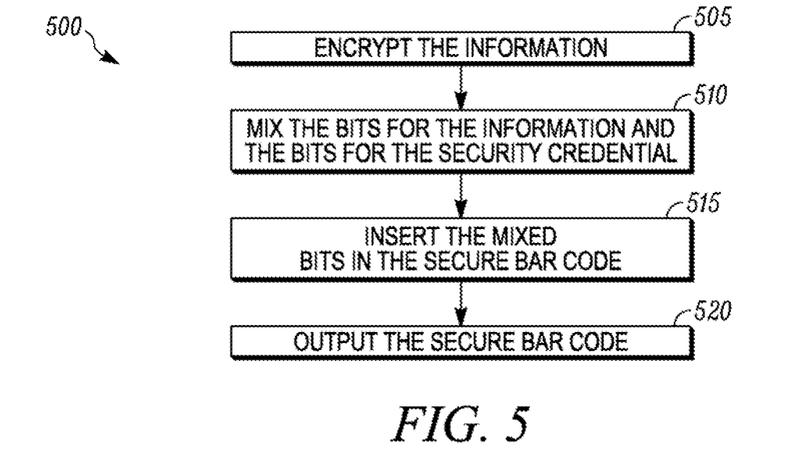
FIG. 5 depicts a high-level flow diagram of a method for providing information using secure bar code according to one embodiment.

FIG. 5 depicts a high-level flow diagram of a method 500 for providing information 175 (e.g., a document) using secure bar code 180 according to one embodiment. The high-level flow diagram represents an example embodiment and those of skill in the art will understand that various steps of high-level flow diagram 500 may be combined and/or added without deviating from the scope and the purview of the embodiment.

At 505, information 175 is encrypted to generate encrypted information. According to one embodiment, first computing device 110 encrypts information 175. According to an alternative embodiment, first computing device 110 may receive the encrypted information from another computing device.

At 510, the bits of security credential 190 are mixed (or scrambled together) with the bits of the encrypted information to form a set of mixed bits. The mixed bits have the predetermined order, which is known by second computing device 115, for example, via storage of a copy of the scrambling information that specifies the predetermined order. First computing device 110 may perform the mixing.

At 515, the mixed bits are inserted into the secure bar code 180. First computing device 110 may insert the mixed bits into secure bar code 180.

At 520, first computing device 110 outputs secure bar code 180, for example, on display 145. According to alternative embodiments, first computing device 110 may output secure bar code 180 in other forms, such as in printed form on a piece of paper. Second computing device 115 may read secure bar code 180 and un-mix the mixed bits to separate the encrypted information from security credential 190 based on the scrambling information that specifies the predetermined order. Thereafter, second computing device 115 may decrypt the encrypted information using security credential 190. The scrambling information that specifies the predetermined order may be a shared secret between first computing device 110 and second computing device 115.

According to another alternative embodiment, secure bar code 180 may be a three-dimensional bar code. Three-dimensional bar code 180 may be formed in a material capable of having a three-dimensional bar code 180 formed therein, such as metal, plastic, etc. First computing device 110 may control another device to form three-dimensional bar code 180 in the material, or may form three-dimensional bar code 180 in the material.

Figure 6:
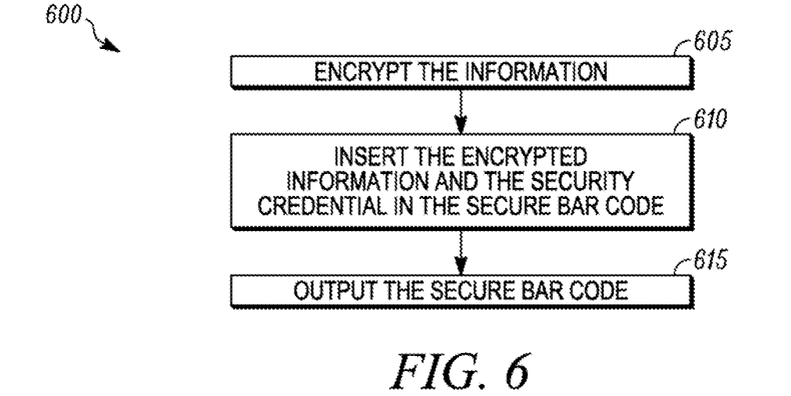
FIG. 6 depicts a high-level flow diagram of a method for providing information using secure bar code according to another embodiment.

FIG. 6 depicts a high-level flow diagram of a method 600 for providing information 175 (e.g., a document) using secure bar code 180 according to one embodiment. The high-level flow diagram represents an example embodiment and those of skill in the art will understand that various steps of high-level flow diagram 600 may be combined and/or added without deviating from the scope and the purview of the embodiment.

At 605, information 175 is encrypted to generate encrypted information. According to one embodiment, first computing device 110 encrypts information 175. According to an alternative embodiment, first computing device 110 may receive the encrypted information from another computing device.

At 610, the encrypted information and network address 195 are inserted into secure bar code 180. Network address 195 identifies a network location of security credential 190 used by second computing device 115 for decrypting the encrypted information. According to a specific embodiment, first computing device 110 inserts the encrypted information and network address 195 into secure bar code 180.

At 615, first computing device 110 outputs secure bar code 180 on display 145 or in another form, such as in printed form. Second computing device 115 may read secure bar code 180 and extract the encrypted information and network address 195 from secure bar code 180. Thereafter, second computing device 115 may use network address 195 to retrieve security credential 190 to decrypt the encrypted information.

Figure 7:
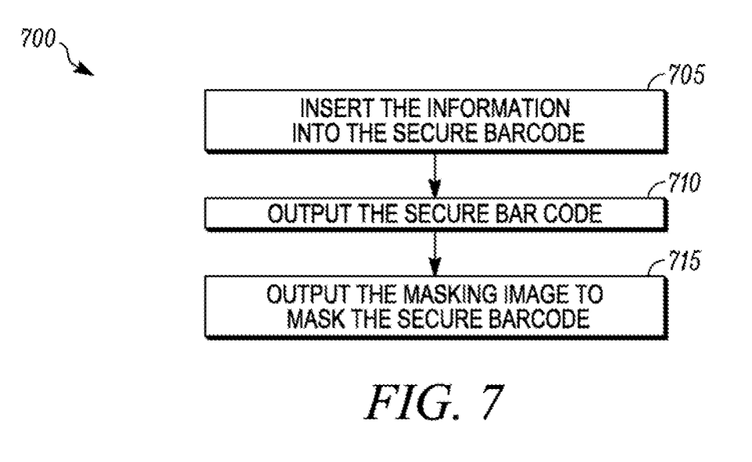
FIG. 7 depicts a high-level flow diagram of a method for providing information using secure bar code according to another embodiment.

FIG. 7 depicts a high-level flow diagram of a method 700 for providing information 175 (e.g., a document) using secure bar code 180 according to another embodiment. The high-level flow diagram represents an example embodiment and those of skill in the art will understand that various steps of high-level flow diagram 700 may be combined and/or added without deviating from the scope and the purview of the embodiment.

At 705, information 175 is inserted in secure bar code 180, for example, by first computing device 110.

At 710, first computing device 110 outputs secure bar code 180 on display 145 or in an alternative form.

At 715, first computing device 110 outputs masking image 405 to mask secure bar code 180. It will be understood that 710 and 715 may be executed substantially simultaneously by first computing device 110. Masking image 405 masks secure bar code 180 according to a masking technique. Second computing device 115 may read secure bar code 180 and masking image 405 and separate masking image 405 from secure bar code 180 based on the masking technique. Subsequently, second computing device 115 may decrypt the encrypted information using secure bar code 180. The masking technique and/or masking image 405 may be shared secrets between first computing device 110 and second computing device 115.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments, along with examples of how aspects thereof may be implemented. The above examples and embodiments should not be deemed to be the only embodiments, and are presented to illustrate the flexibility and advantages of the teachings hereof. Based on the above disclosure and the following claims, other arrangements, embodiments, implementations, and equivalents may be employed without departing from the scope hereof, as defined by the claims.

We claim:

1. A method of providing a document using a secure bar code, the method comprising:
   encrypting, via a computing device including a bar code reader, the document to generate an encrypted document;
   mixing together, via the computing device, bits for a security credential with bits for the encrypted document to generate a set of mixed bits having a predetermined order, wherein the security credential is for decrypting the encrypted document;
   providing, to the computing device, scrambling information that specifies the predetermined order, where the scrambling information is shared between a portion of the computing device and the bar code reader;
   inserting, via the computing device, the set of mixed bits into the secure bar code; and
   outputting the secure bar code, wherein the computing device knows the predetermined order and is configured to read the secure bar code using the bar code reader according to the received scrambling information, un-mix the mixed bits based on the predetermined order, and decrypt the encrypted document with the security credential.

2. The method of claim 1, further comprising:
   selecting the predetermined order from a plurality of predetermined orders, wherein:
      the predetermined orders are respectively associated with marker positions that are included in a plurality of marker positions,
      the marker positions are positions in the secure bar code, and each of the marker positions uniquely indicates use of one of the predetermined orders in the secure bar code; and
      inserting a marker at one of the marker positions that is associated with the predetermined order.

3. The method of claim 2, wherein the computing device knows the predetermined order based on the marker position of the marker.

4. The method of claim 1, wherein the secure bar code is a two-dimensional bar code or a three-dimensional bar code.

5. A method of providing a document using a secure bar code, the method comprising:
   encrypting, via a computing device including a bar code reader, the document to generate an encrypted document;
   mixing together, via the computing device, the encrypted document and a network address into the secure bar code to generate a set of mixed bits having a predetermined order, wherein the network address identifies a network location of a security credential for decrypting the encrypted document;
   providing, to the computing device, scrambling information that specifies the predetermined order, where the scrambling information is shared between a portion of the computing device and the bar code reader; and
   outputting the secure bar code on a display, wherein the bar code reader of the computing device is configured to read the secure bar code using the bar code reader, un-mix the network address according to the received scrambling information, access the network location based on the network address to retrieve the security credential, and decrypt the encrypted document with the security credential.

6. The method of claim 5, wherein the network location is password protected.

7. A method of providing a document using a secure bar code, the method comprising:
   encrypting the document to generate an encrypted document;
   inserting the encrypted document into the secure bar code;
   mixing together bits for a security credential with bits for the encrypted document to generate a set of mixed bits having a predetermined order, where the security credential is for decrypting the encrypted document, and where inserting the encrypted document into the secure bar code includes inserting the set of mixed bits into the secure bar code;
   sharing, between a portion of the computing device and a bar code reader of the computing device, the scrambling information that specifies the predetermined order;
   outputting, via the computing device, the secure bar code for display; and
   outputting, via the computing device, a masking image masking the secure bar code, wherein:
      the masking image masks the display of the secure bar code according to a masking technique, and
      the computing device is configured to read the secure bar code and the masking image using the bar code reader, separate the masking image from the secure bar code based on the masking technique to isolate the secure bar code, extract the encrypted document from the secure bar code according to the received scrambling information, and decrypt the encrypted document with the security credential.

8. The method of claim 7, wherein the masking technique is a shared secret between the computing device and the bar code reader.

9. The method of claim 7, further comprising:
receiving the masking image from a second computing device via a network; and
inserting a network address for the masking image in the secure bar code.

10. The method of claim 7, further comprising:
selecting the predetermined order from a plurality of predetermined orders, wherein:
the predetermined orders are respectively associated with marker positions that are included in a plurality of marker positions,
the marker positions are positions in the secure bar code, and each of the marker positions uniquely indicates use of one of the predetermined orders in the secure bar code; and
inserting a marker at one of the marker positions that is associated with the predetermined order.

11. The method of claim 10, wherein the computing device knows the predetermined order based on the marker position of the marker.

12. The method of claim 7, further comprising:
inserting the document in the secure bar code includes inserting, via the computing device, the encrypted document and a network address into the secure bar code,
the network address identifies a network location of a security credential for decrypting the encrypted document, and
the bar code reader is configured access the network location based on the network address to retrieve the security credential, and decrypt the encrypted document with the security credential.

13. The method of claim 12, wherein the network location is a password protected network location.

\* \* \* \* \*